(12) United States Patent
Williamson et al.

(10) Patent No.: US 9,574,923 B2
(45) Date of Patent: Feb. 21, 2017

(54) WATER METER SYSTEMS AND METHODS WITH BYPASS-FLOW PATH AND RECHARGEABLE ENERGY STORAGE

(71) Applicant: Capstone Metering LLC, Flower Mound, TX (US)

(72) Inventors: James Scott Williamson, The Colony, TX (US); John Michael Killmeyer, Allen, TX (US); Joshua James Malone, Plano, TX (US); Walton Scott Corbitt, Flower Mound, TX (US); Walter Scott Williamson, Flower Mound, TX (US)

(73) Assignee: Capstone Metering LLC, Flower Mound, TX (US)

( * ) Notice: Subject to any disclaimer, the term of this patent is extended or adjusted under 35 U.S.C. 154(b) by 219 days.

(21) Appl. No.: 14/135,358

(22) Filed: Dec. 19, 2013

(65) Prior Publication Data

US 2014/0165719 A1    Jun. 19, 2014

Related U.S. Application Data

(60) Provisional application No. 61/739,363, filed on Dec. 19, 2012.

(51) Int. Cl.

| | | |
|---|---|---|
| *G01F 15/00* | (2006.01) | |
| *G01F 1/06* | (2006.01) | |
| *G01F 1/36* | (2006.01) | |
| *G01F 7/00* | (2006.01) | |
| *G01F 1/07* | (2006.01) | |
| *G01F 1/40* | (2006.01) | |

(52) U.S. Cl.
CPC ............... *G01F 15/00* (2013.01); *G01F 1/06* (2013.01); *G01F 1/363* (2013.01); *G01F 7/00* (2013.01); *G01F 1/07* (2013.01); *G01F 1/40* (2013.01)

(58) Field of Classification Search
CPC .......... G01F 3/12; G01F 15/14; G01F 15/007; G01F 7/00; G01F 15/00; G01F 1/06; G01F 1/363; G01F 1/07; G01F 1/40; F03B 11/02; F01B 11/02; G01K 17/06
USPC ................ 73/272, 861, 202, 202.5, 195–198
See application file for complete search history.

(56) References Cited

U.S. PATENT DOCUMENTS 4,101,874 A * 7/1978 Denison .................. G01F 1/075
                                                        116/204
4,175,434 A * 11/1979 Bradham, III ............ G01F 7/00
                                                        73/197

(Continued)

FOREIGN PATENT DOCUMENTS

| JP | 06323887 A | * 11/1994 |
| JP | H06323887 A | 11/1994 |

OTHER PUBLICATIONS

International Search Report for PCT/US2013/076723.

*Primary Examiner* — Lisa Caputo
*Assistant Examiner* — Nathaniel T Woodward
(74) *Attorney, Agent, or Firm* — Winstead PC (57) ABSTRACT

A linear water meter system may include a metering system, a ball valve, a power generation system, a wireless communication system, or a combination thereof. The linear water meter system may provide a linear pathway through the meter that minimizes pressure loss in the system. Two pathways may be provided through the power generation system. One pathway may be utilized to generate power, and the other pathway may provide a bypass that can be utilized to maintain a desired water pressure level in the system.

20 Claims, 7 Drawing Sheets

(56) References Cited

U.S. PATENT DOCUMENTS

| | | | | |
|---|---|---|---|---|
| 5,063,786 A | * | 11/1991 | Sanderson | G01F 1/3227 |
| | | | | 73/861.19 |
| 5,876,610 A | * | 3/1999 | Clack | B01D 35/143 |
| | | | | 210/282 |
| 6,062,819 A | * | 5/2000 | Zangeneh | F04D 29/2205 |
| | | | | 415/181 |
| 2006/0245467 A1 | * | 11/2006 | Casella | G01D 4/002 |
| | | | | 374/41 |
| 2007/0284293 A1 | | 12/2007 | Pitchford et al. | |
| 2008/0143109 A1 | | 6/2008 | Pitchford et al. | |
| 2012/0210708 A1 | | 8/2012 | Dunn et al. | |
| 2012/0305113 A1 | * | 12/2012 | Williamson | G01F 25/00 |
| | | | | 137/561 R |

* cited by examiner

WATER METER SYSTEMS AND METHODS WITH BYPASS-FLOW PATH AND RECHARGEABLE ENERGY STORAGE

RELATED APPLICATIONS

This application claims the benefit of U.S. Provisional Patent Application No. 61/739,363, filed on Dec. 19, 2012, which is incorporated herein by reference.

FIELD OF THE INVENTION

This invention relates to water meter systems and methods. More particularly, to water meter systems and methods that provide a linear design, an counting wheel suitable for low flow metering, self-generating energy, a bypass flow path, and/or rechargeable energy storage.

BACKGROUND OF INVENTION

Fluid meters are utilized to measure volume of fluid usage. For example, in some countries, water meters are used at each residential and commercial building in a public water supply system. To the extent that conventional water meters can transmit usage data, these meters are typically capable of transmitting data only relatively infrequently due to power issues and other constraints. For example, this transmission distance is generally limited, requiring field technicians to either read the meter directly or from a relatively short distance away. Water meters may utilize a limited power source, such as a battery, to power the meter. As a result, the batteries in a water meter may be replaced by an operator every 6 to 12 months. If the power source is rechargeable, it may not be easily be recharged because water meters are not typically connected to an external power source. Further, after 3-5 years of operation, wear and tear may require meters to be recalibrated. Worn meters may over or under read the amount of fluid passing through the meter and it may require significant effort and expense to systematically check and calibrate individual meters in a given service area. Additionally, the dimension of a typical water meter do not necessitate placement of water meters in the walls of a building or the like. Finally, many water meters redirect the flow of fluid through the meter, which may require the restoration of pressure in a water system.

Water meter systems and methods discussed herein that provide a linear design, wireless communication, self-generating energy, and/or rechargeable energy storage may provide significant improvements over currently available water meters. Additionally, the water meter systems and methods are operable in low flow conditions, and can achieve a high turndown ratio.

SUMMARY OF THE INVENTION

In an illustrative implementation, a water meter provides a metering system, ball valve, power generation system, or a combination thereof. The fluid flow through the metering system, ball valve, and the power generation system is a linear pathway. In some embodiments, a ball valve is integrated into the water meter.

In some embodiments, a metering system comprises an inlet with a tapered section, a counting wheel with one or more blades embedded with a magnet, and one or more electronic switches near the counting wheel housing, wherein the magnet trips the one or more electronic switches when rotating by the switches.

In some embodiments, counting wheel blades are curved to allow smooth rotation of the counting wheel. In some embodiments, the blades are curved into the flow of fluid to increases the amount of energy captured from the flow. In some embodiments, front surfaces of the blades are broad at the bottom to maximize the contact with the water. In some embodiments, a structural rig disk in the center of the counting wheel is integrated into the blades to add structural rigidity to the blades. In some embodiments, back sides of the blades are closed and curved away from the flow of water to cut through the water with minimal resistance, thereby improving measurement at low flow.

In some embodiments, a power generation system may comprise a turbine positioned along a first flow stream in the power generation system, wherein the fluid flowing through the first flow stream causes the turbine to rotate. In some embodiments, the power generation system may comprise a door position in a second flow stream, wherein when a flowrate of the fluid is below a predetermined amount the door is in a closed position to prevents fluid flow through the second flow stream, and when the flowrate of the fluid exceed the predetermined amount the door is in an open position to allow fluid flow through the second flow stream.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION OF EXEMPLARY EMBODIMENTS

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

Water meter systems as discussed herein may be designed to provide linear flow path so that the system can minimize pressure loss in the system. In some embodiments of the water meter system, the system may comprise a metering system, power generation system, shutoff system, wireless communication system, and/or a combination thereof. In some embodiments, the water meter system allows operation in low flow conditions.

In some embodiment, a linear water meter system is 7½ inches in length which is in compliance with the AWWA Standards. The water meter system provides a continuous linear or substantially linear flow path through the system to minimize turbulent flow. The design reduces the amount of pressure lost caused by the water meter system. By eliminating various pipe turns and reducing turbulent flow, the system reduces the amount of pressure loss. By reducing the amount of the pressure loss, additional components for restoring pressure in the water system are not necessary. The power generation features, wireless communication, and calibration features allow for reduced maintenance cost. For example, batteries do not need to be replaced, technicians do not need to remove and recalibrate said water meter systems, and wireless communication allows for remote operation of the meters. These features of the linear water meter systems discussed herein provide significant benefits over other water meters.

Figure 1A:
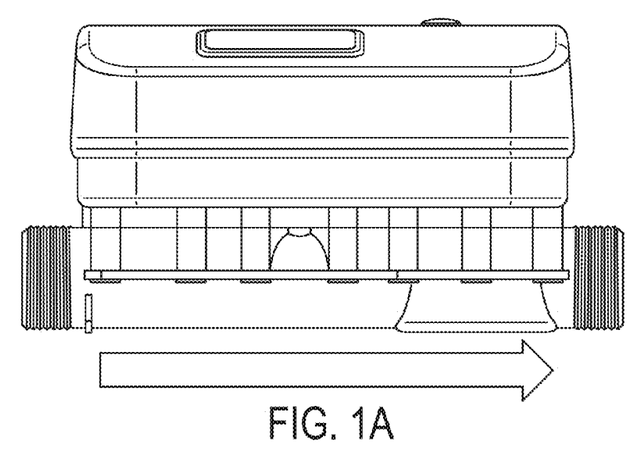
FIGS. 1A-1D are illustrative embodiments of a side, top cross section, front cross section, and side cross section views of a linear water meter system.
Figure 1B:
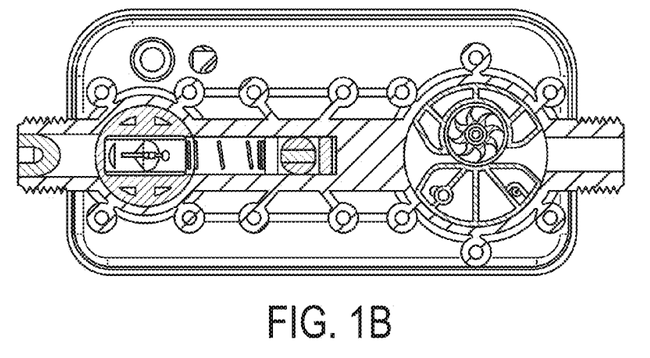
Figure 1C:
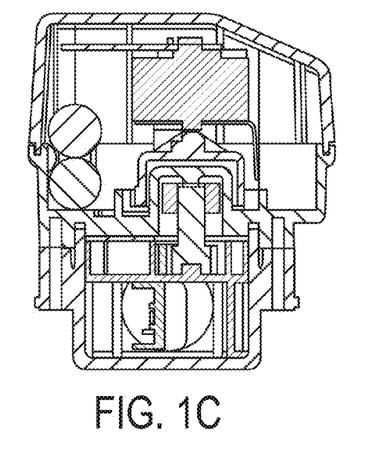
Figure 1D:
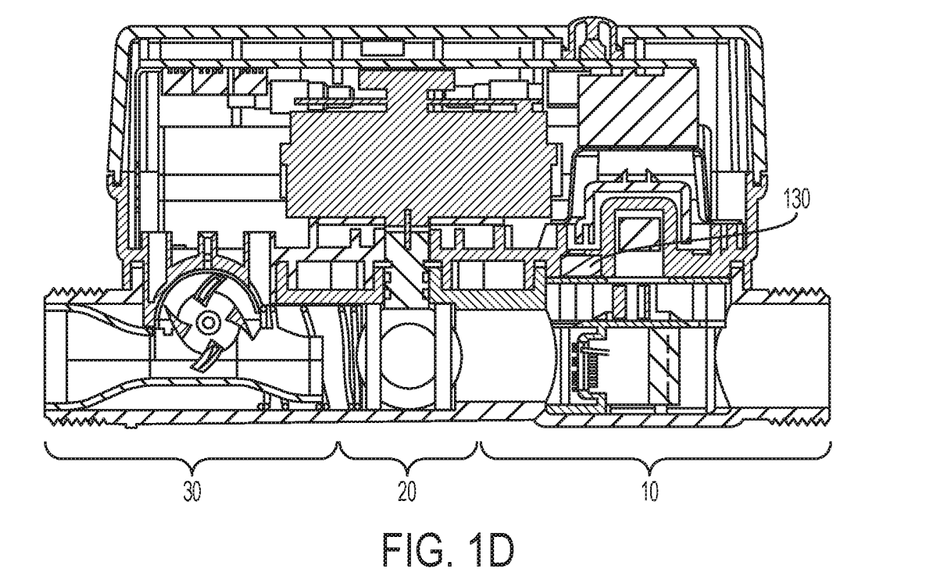
Figure 1E:
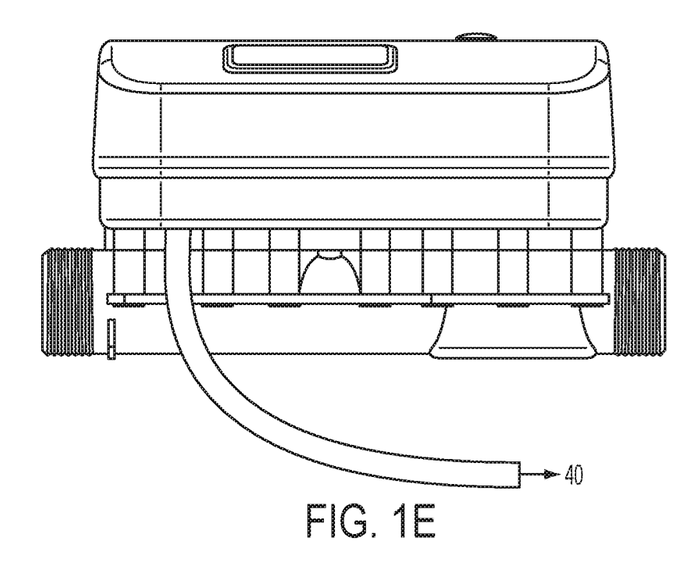
FIG. 1E is an illustrative embodiment of a linear water meter coupled to a wireless system.
Figure 2:
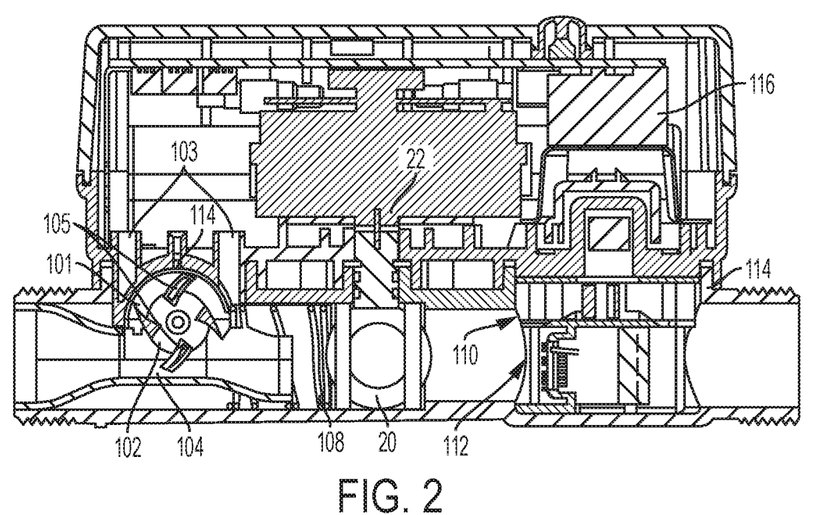
FIG. 2 is an illustrative embodiment of a linear water meter detailing the various components of the water meter.

FIGS. 1A-1D are illustrative embodiments of a side, top cross section, front cross section, and side cross section views of a linear water meter system. FIG. 2 is an illustrative embodiment of a linear water meter detailing the various components of the water meter. The system may provide a power generation system 10, ball valve 20, metering system 30, and wireless system 40. Water flows into the system through the metering system 30 to the ball valve 20 and exits through the pressure monitoring and power generation system 10 in a linear or substantially linear pathway. A substantially linear pathway is a pathway in which the majority of the fluid pathway is linear. As shown in FIG. 1E, in some embodiments, linear water meter system may provide a wireless communication system 40. In the embodiment shown, a wireless communication system 40 may be disposed on top of the linear water meter system. The linear water meter system may be coupled to an external wireless communication system 40 that provides two-way communication; however, in other embodiments, the wireless communication system may be integrated into the linear water meter system. For example, the wireless communication system 40 may allow information from the meter to be wirelessly transmitted to a desired end location; transmitted to a nearby data relay station that allows the data to be transmitted to a desired end location; transmitted to a nearby operator; or a combination thereof. The wireless communication system 40 may allow data from the pressure monitoring and power generation system 10, ball valve 20, and/or metering system 30 to be transmitted. Further, the wireless communication system 40 may allow the linear water meter system to receive information wirelessly. For example, remote commands or scheduling/rescheduling may be sent wirelessly to request data or control operations of the pressure monitoring and power generation system 10, ball valve 20, and/or metering system 30. Further, the wireless communication system 40 may allow the linear water meter to be operated or programmed/reprogrammed remotely. Commands can be sent wirelessly to the meter, such as to change the times when the information is collected by the meter. For example, when the meter measures water pressure can be modified remotely. As another example, the ball valve may be opened or closed remotely or the metering system 30 may be recalibrated remotely. The wireless communication system 40 may operate utilizing any suitable wireless communication method, such as RF, Wi-Fi, cellular communication, Bluetooth, etc.

Figure 3:
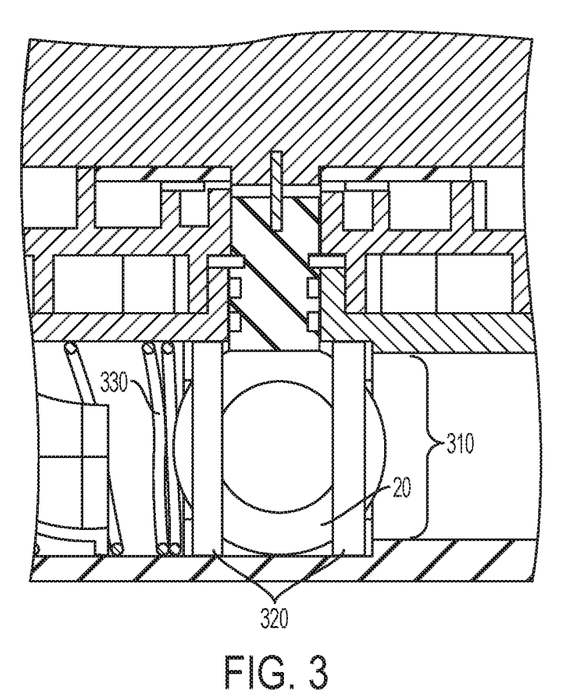
FIG. 3 is an illustrative embodiment of an integrated ball valve.

Ball valve 20 is disposed between the power generation 10 and metering system 30. FIG. 3 is an illustrative embodiment of an integrated ball valve 20. The ball valve assembly 310 is held in position in the water channel. Ball valve 20 is positioned in the water channel with seals 320 on both sides. The integrated ball valve 20 minimizes compression on the ball valve, thereby resulting in reduced torque necessary to operate the ball valve. After the ball valve 20 and seals 320 are in place in the meter, the assembly is secured in position with a ball valve spring 330. As shown, the ball valve 20 is incorporated into the linear or straight pipe design to minimize flow obstructions through the meter. Ball valve 20 may be opened and closed to control flow through the meter. The ball valve 20 contains a ball with an opening that may be rotated to alter the amount of water that can passes through the opening in the ball. The ball may be rotated to a closed position to stop flow through the ball valve, to a fully open position that allows for maximum flow, or to a position in between the fully open and closed position that allows a flow rate in between the maximum flow rate and no flow. In some embodiments, the ball valve 20 may be operated and controlled by a ball valve actuator 22, such as an electrical actuator, mechanical actuator, and/or any other suitable actuator. In some embodiments, ball valve 20 may be remotely operated via a wireless communication system. In some embodiments, the position of the ball valve 20 in the linear water meter relative to the power generation system 10 and metering system 30 may be modified. For example, ball valve 20 may be place after the power generation system 10 or ahead of the metering system 30.

In some embodiments, the linear water meter system may provide one or more acoustic sensors 130. The acoustic sensor 130 may be positioned anywhere along the flowpath of the linear water meter. In a preferred embodiment, the acoustic sensor 130 is positioned where there is minimal or no turbulent flow. As a nonlimiting example, the acoustic sensor 130 may be positioned in power generation system before or after the stream separates into two streams where turbulent flow is minimal. The movement of water through and in near proximity to the meter creates a unique sound pattern. This pattern can be used to detect the type of liquid in the system and the movement of the liquid in the system. The acoustic sensor 130 may capture the sound patterns and convert them to digital data. When the ball valve 20 of the meter is closed, the acoustic sensor 130 may listen for the movement of water at or near the meter. When the ball valve 20 is closed, the movement of water in the system would indicate there is a leak in the system. In additional to more accurately identifying leaks, the acoustic sensor 130 may enable the identification of obstructions in the system as well. For example, an obstruction in the line may cause a sound pattern that is different from an unobstructed line. In some embodiments, the acoustic sensor 130 may be integrated into the meter.

Figure 4:
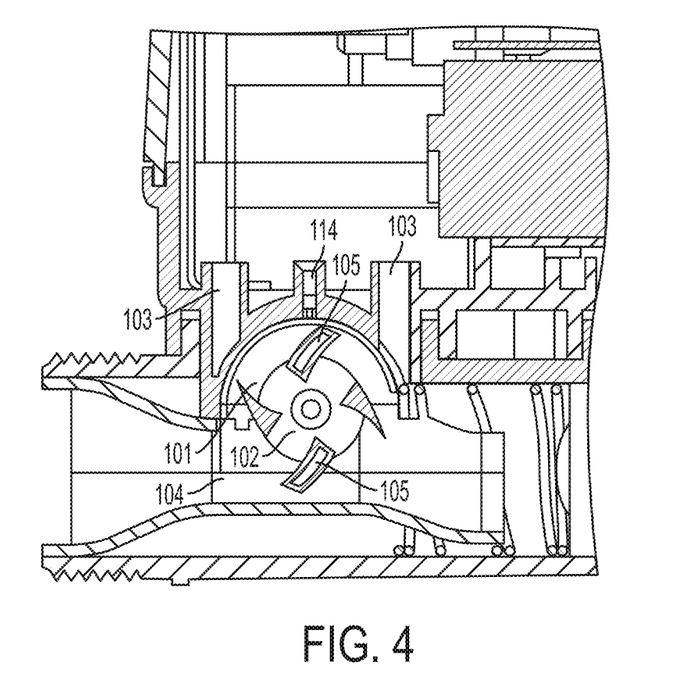
FIG. 4 is enlarged view of an illustrative embodiment of a metering system.

FIG. 4 is enlarged view of an illustrative embodiment of a metering system 30. Metering system 30 receives and determines the amount of flow through the meter. Counting wheel housing 101 provides a taper 104 below the counting wheel 102 to constrain the flow of water and force a greater volume of water to contact the counting wheel. As water flows through taper 104, it causing counting wheel 102 positioned in the counting wheel housing 104 to rotate. This unique flow sequence of water through the meter improves the accuracy of the measurement by reducing the waters turbulence at the time it passes the counting wheel 102. One or more magnets 105 may be integrated in the blades of counting wheel 102 without altering the blade surface that contacts the flow or the curvature of the blade. One or more electronic switches 103 may be positioned near the counting wheel housing 104 in proximity to counting wheel 102. As counting wheel 102 rotates, electronic switches 103 are tripped by the magnets 105 as they rotating pass the electronic switch, thereby allowing the rotation of the counting wheel 102 to be monitored. The frequency with which the magnets 105 pass the electronic switch 103 is monitored and utilized to calculate the volume of water that flows through the metering system. The number of trips and time between trips enable the calculation of the flow of water. An algorithm may be utilized in conjunction with the number of trips of the switch 103 to determine the volume of water that has passed through the metering system. In some embodiments, the metering system 30 may be capable of being recalibrated to improve metering accuracy. For example, a wireless communication system may be utilized to remotely recalibrate the metering system 30.

Additionally, electronic switches 103 may also enable the detection of backflow, a condition where water flows backwards through the linear water meter system. For example, when electronic switches 103 indicate the counting wheel 102 is tripping the electronic switches in an opposite order (i.e. tripping the left switch before the right switch). The counting wheel 102 extends into the taper 104. The taper 104 enables the metering system to have and maintain consistent smooth flow of water pass the counting wheel 102. Further, this allows the metering to have a limited impact on the pressure loss in the meter.

The design of the counting wheel enables the accurate measurement of the flow of liquids at low, intermediate, and high flow rates, such as flow rates equal or between 0.25 gallons to 5 gallons per minute, between 5 to 10 gallons per minute, and equal to or greater than 10 gallons per minute. In one embodiment, the metering system provides accurate measurement of fluid flow equal to or between 0.25 gallon/minute to 20 gallons/minute. Desired turndown ratio in the water industry today is 60:1, which is not often achieved. The turndown ratio indicates the range of a specific meter is able to measure with acceptable accuracy. This metering system can achieve a 60:1 turndown ratio or greater.

Figure 5A:
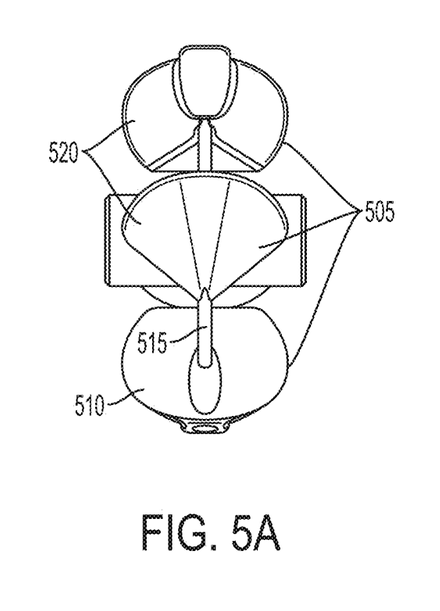
FIGS. 5A-5B show various views of a counting wheel.
Figure 5B:
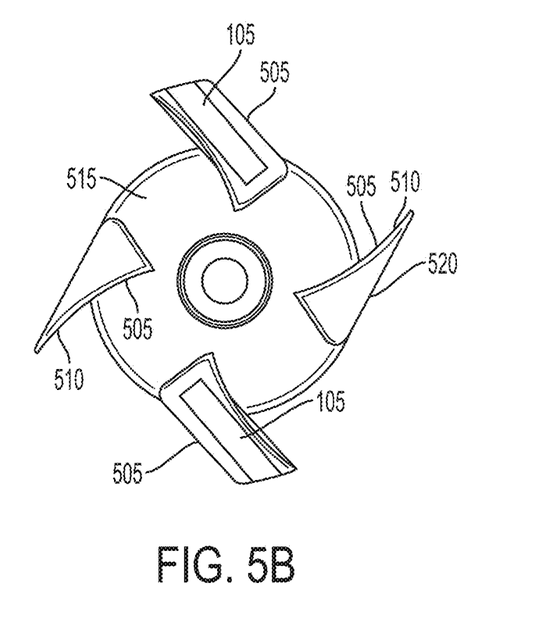

FIGS. 5A-5B show various views of the counting wheel 102. The counting wheel 102 comprises a light weight material to enable it to perform at low flow rates. The design of the counting wheel blades 505 is curved to create a smooth rotation of the counting wheel. In some embodiments, the front surfaces 510 of the blades 505 are curved into the flow of water. This increases the amount of energy captured from the flow of water compared to a straight blade counting wheel. The front surface 510 of the blade 505 is broad at the bottom to maximize the contact with the water. The broad front surface 510 of the blade 505 is maximized to fit and function within the taper 104. The structural rig disk 515 in the center of the counting wheel is integrated into the blades. It provides structural re-enforcement to the counting wheel blades. The back side 520 of the blade is curved away from the flow of water to cut through the water with minimal resistance to improve the measure at low flow.

Figure 6:
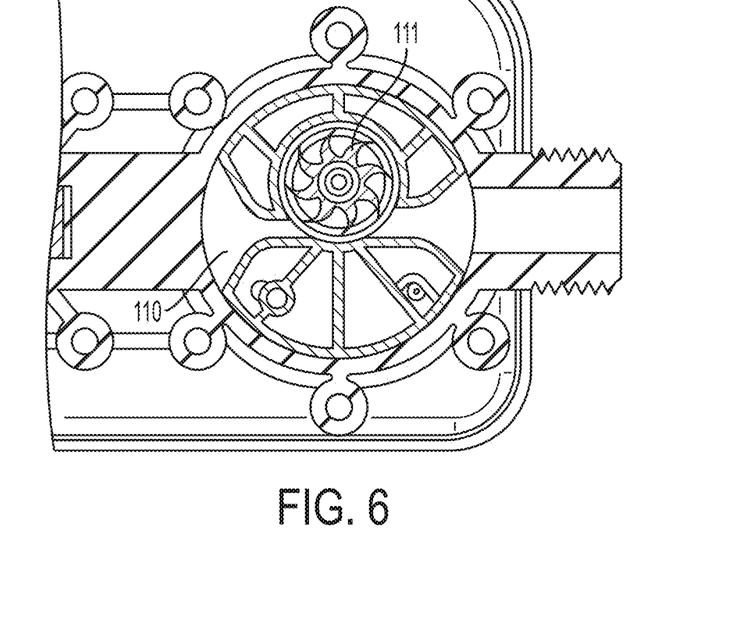
FIG. 6 is an illustrative embodiment of a first stream of a power generation system.
Figure 7A:
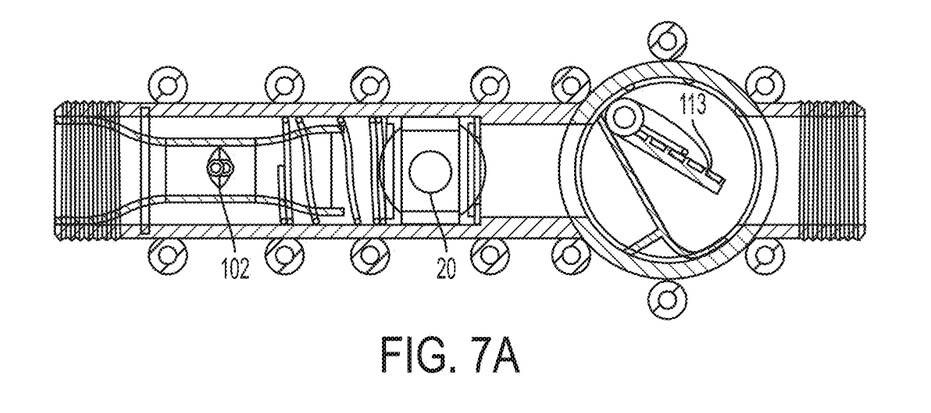
FIGS. 7A-7B are illustrative embodiments of a second stream of a power generation system providing a bypass.
Figure 7B:
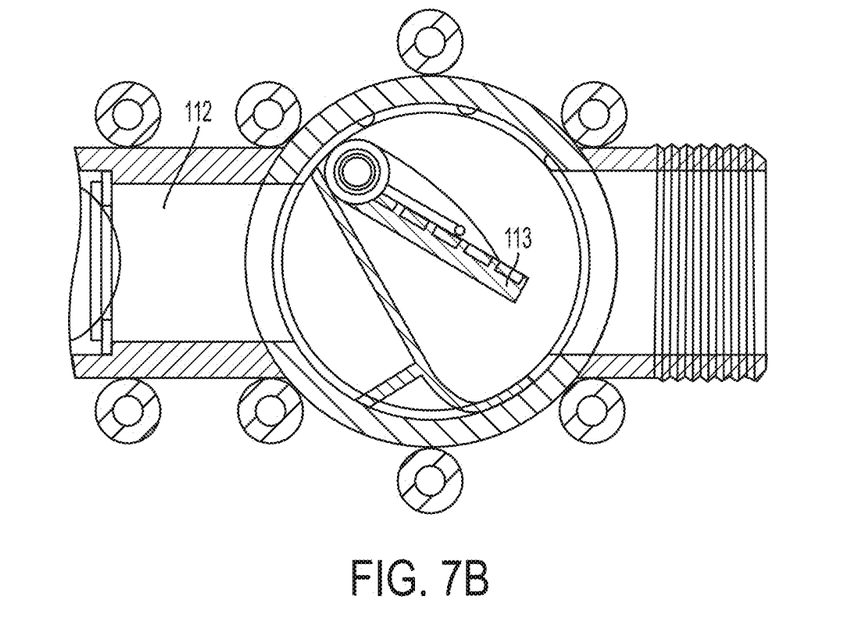

Water flows into the power generation system 10 as a single stream. The water flows from the metering system 30 to the ball valve 20, and finally to the power generation system 10. Within the power generation system 10, the flow of water is divided into two flow streams. FIGS. 6 and 7A-7B are top and bottom views of an illustrative embodiment of the power generation system 10. Referring to the top view in FIG. 6, a first stream 110 directs the flow of water at a turbine 111 which is in the flow path of the first stream. The first stream 110 is narrow and contains the turbine 111 that is positioned in the water path of the first stream. The first stream enables the energy contained in the water to be focused on the turbine 111 and start the rotation of the turbine, even in low flow conditions. In some embodiments, low flow conditions may be equal to or less than 5 gallons per minute. In some embodiments, low flow conditions may be equal to or between 0.25 to 5 gallons per minute. In other embodiments, low flow conditions may be equal to or between 0.25 to 2 gallons per minute. The flow of water spins the turbine 111, which may cause the shaft of a power generator 116 (see FIG. 2) to turn and generate electricity. In some embodiments, the turbine 111 may be coupled to the power generator 116 by a non-contact, zero thrust generator coupling. In some embodiments, the turbine 111 connects to the power generator 116 magnetically through the housing. For example, the turbine 111 may be coupled to the generator 116 with one or more sets magnets via magnetic coupling. As the turbine 111 and magnet(s) provided by the turbine rotate, magnetic forces couple the turbine 111 to magnet(s) provided by generator 116 and cause a rotor of the generator to rotate as well. When the turbine 111 spins with the flow of water, the shaft of the power generator 116 spins generating power. This power may be transferred to a power storage unit for storage or for providing power to operate various features of the meter. For example, the power may be utilized to recharge a rechargeable battery, power a display providing metering information, a wireless communication system, metering system, pressure monitoring system, CPU, electronic actuator for the ball valve, and/or the like.

In addition, the meter measures the water pressure as it enters the meter and as it exits the meter through the power generation system (See pressure sensor ports 114 in FIG. 2). The difference in pressure readings from pressure sensors enable the meter to calculate the flow rate of the water in the meter at high flow rates (e.g. 10 gallons per minute or more), low flow rates (e.g. ≤5 gallons per minute), and intermediate flow rates in between without increasing the pressure loss in the meter to above the AWWA standard or 15 psi at a flow rate of 20 gallons per minute. In some embodiments, the meter provides pressure losses of 15 psi or less at 15 gallons per minute. Referring to FIG. 2, pressure readings may be provided from two pressure sensor ports 114. Pressure sensor ports 114 connect to differential pressure sensors in the meter. The first pressure sensor port measure the water pressure as it enters the meter. The second pressure sensor measures the water pressure as it exits the meter. There are measurable differences in the pressure that enable the flow rate of the water in the meter to be measured, including when the door 113 in the open or closed position. The Venturi tube design utilized in the meter allows the flow of the liquid to be measured with pressure sensors. Further, this design allows the flow rate to be measured, even with a variable flow channel that includes a first stream and second stream.

Referring to the bottom view shown in FIGS. 7A-7B, a second flow stream 112 may be obstructed by a door 113. The door 113 is shown in an open position. The door 113 is hinged, and may be held in the closed position by a spring or the like. The door may be held in the closed position by the resistance of a spring. When water flows through the meter at a low flow rate (e.g. ≤5 gallons per minute), the spring force exerted on door 113 remains greater than the water pressure in the second flow stream 112. As such, door 113 remains in a closed position to prevent fluid flow through the second flow stream 112, and the water is forced into the first stream 110 with turbine 111 for generating power. In some embodiments, the door 113 may remain in a closed position when the flow rate is equal to or below 5 gallons per minute.

As the flow rate increases, the first stream 110 may be unable to allow the higher flow rate to pass through the first stream, thereby causing pressure to increase in the first stream and second stream 112. As pressure builds up, the higher pressure may force the door 113 to an open position when the water pressure is greater than a spring rate of the spring. Thus, the door 113 may be tuned to remain in a closed position below a predetermined flow rate, and to move to an open position when the flow rate is greater than the predetermined flow rate. It will be recognized by one of ordinary skill in the art that the predetermined flowrate may be set any suitable flowrate desired. As a nonlimiting example, in an embodiment where the predetermined flow rate is 5 gallons per minute, the door 113 remains in the closed position when the flow rate is 5 gallons per minute or lower. However, if the flow rate rises above 5 gallons per minute, the door 113 moves to an open position.

When in the open position, water flow is allowed through the first stream 110 and the second stream 112. When door 113 is open, a second flow path is opened that provides minimal or no pressure loss, thereby allowing the meter to maintain pressure loss within a desired range. In some embodiments, door 113 allows the meter provides pressure losses of 15 psi or less at 15 gallons per minute. It should also be apparent that door 113 also reduces total back pressure by providing a second flow path. Door 113 remains open to allow the water to exit the meter until the water pressure drops below the spring rate of the spring. Once the water pressure drops below the spring rate of the spring, the door closes and water flow is obstructed by door 113. Door 113 allows water pressure to be increase when the water pressure is low. This two stream design maintains the water pressure necessary to turn the turbine 111 at low flow rates. Further, this enables the meter to generate power at low flow rates and keep the meters pressure loss within the standards of the American Water Works Association and customer demands. Even at low flow, the two stream design allows a pressure calibration signal to be produced.

Figure 8:
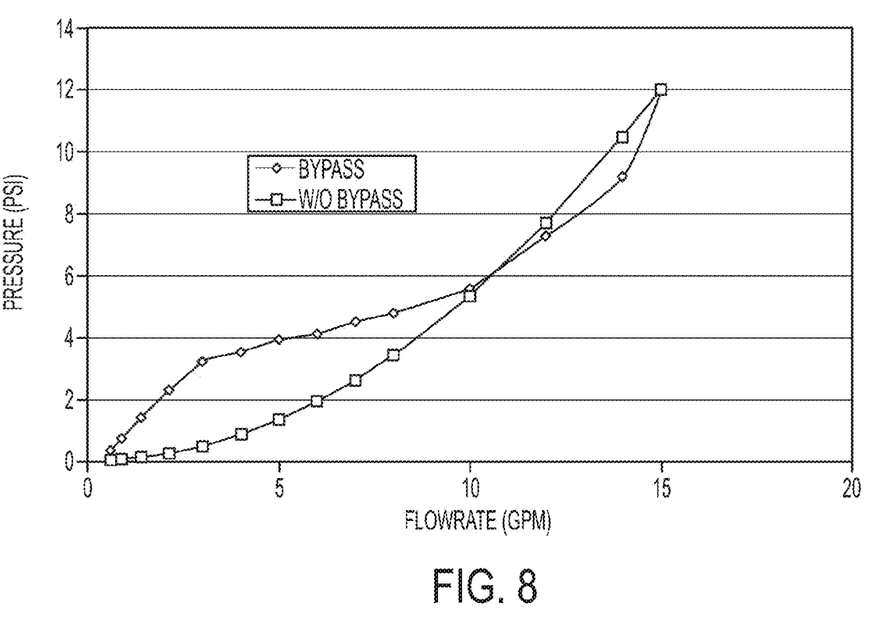
FIG. 8 shows differential pressure v. flowrate for a meter with and without a bypass.

FIG. 8 shows differential pressure v. flowrate for a meter with and without a bypass. In a meter without a bypass, differential pressure remains low at low flowrates. As discussed previously, differential pressure may be utilized to the flowrate of fluid passing through the meter, and consequently allow fluid metering. However, at low flowrates in a meter without a bypass, differential pressure may not be sufficient to accurately calculate the flowrate. As shown in FIG. 8, a meter with a bypass provides significantly higher differential pressure at low flowrates. In fact, a meter with a bypass provides higher differential pressure when the flowrate equal to or less than approximately 11 gpm. The increased differential pressure at low flowrates allows a meter with a bypass to provide accurate flowrate calculations based on differential pressure. Further, a meter with a bypass provides improved granularity at low flowrates due to the increased differential pressure. Thus, even in low flow conditions, a meter with a bypass can provide accurate flowrate calculations based on differential pressure and improved granularity for the flowrate calculations.

Water meter systems providing power generation and metering are described in International Application Number PCT/US2007/068242 filed May 4, 2007 to Williamson et al. and International Application Number PCT/US2009/052426 filed Jul. 31, 2009 to Williamson et al., which are herein incorporated by reference. Water meter systems discussed in U.S. Provisional Patent Application No. 61/588,358 filed Jan. 19, 2012 to Williamson et al is also herein incorporated by reference. It will be recognized by one of ordinary skill in the art that features abovementioned Applications may be incorporated in the water metering systems discussed in the present application.

Interchangeable caps may be provided on both end of the water meter system to provide adapters for the inlet and outlet. The interchangeable caps may be made from a metallic material or any other suitable materials. Interchangeable caps may be threaded to allow coupling to the inlet and outlet of the water meter system. Interchangeable caps may be provided in a variety of different sizes that allow the water meter system to be utilized with a variety of connectors of different sizes and/or types. Interchangeable caps allow the meter to fit to a variety of connections by changing the interchangeable caps, which requires no modification to the meter itself. As a nonlimiting example, the interchangeable caps may attached to a meter to allow it to fit in a gap larger than gap between the inlet and outlet of the meter; to connect to inlets and outlets that are offset in height, and/or inlets/outlets that have connectors that do not match the meter's inlet/outlet.

Housing—The housing and most parts of the water meter system may be any suitable material including, but not limited to, injection molded plastic. For example, housing may be ABS plastic for potable water safety. In an exemplary implementation, the housing provides a small footprint that allows the meter to be placed conveniently within building walls. However, in other implementations, the dimensions of the housing can be modified depending on the space restrictions of a wall the water meter system is to be placed in. The housing may provide one or more slots for replaceable PCB boards, which can contain an embedded processing unit and an embedded rechargeable energy storage capacitor. Input and output openings on each side of the housing are designed to fit interchangeable caps that allow any sized connector to be mated to the water meter system, thereby allowing flexibility for various municipality fitting standards. The housing may provide an area for placing attaching an LCD device to the meter. All parts within the housing are easily replaceable.

LCD Display Device—Digital data regarding water flow volume, velocity, pressure, temperature, or the like can be displayed through an LCD display device.

Calibration System—Water meters may lose calibration accuracy after a period of usage, which reduces the accuracy of the meter readings of the quantity of water usage. This water meter system may contain built-in temperature and pressure sensors that provide data to the utility operations center through wireless communication. The temperature and pressure data, along with quantity over time data and a differential pressure calibration tube, allows the utility operations center to calculate calibration correction data to transmit to the meter through the wireless communication device.

Wireless Communication Device—This water meter system may contain within the housing a two-way wireless communication device capable of transmitting data to a utility operations center regarding water flow volume and velocity, water temperature, water pressure, valve state, and/or other data. Further, commands can be transmitted to the meter from the utility operations center to control the ball valve state or to request data from the water meter system. The water meter system is capable of housing multiple formats of wireless communication devices including, but not limited to, Bluetooth, Zigby, RF, cellular telephony wireless technology, or the like.

Sand Trap Mechanism—The bottom of the path of the water flow through the housing of the water meter may have two indentures that will catch and hold sand or dirt that may fall from the water through the force of gravity. The indentures can be emptied through an opening in the bottom of the housing.

Sensors—Pressure sensors, differential pressure sensors, and/or temperature sensors may be located near the input opening to detect and record pressure, temperature and to allow for re-calibration of the meter.

Processing Unit—A programmable processing unit is located inside the plastic housing, embedded within a thin PCB board. The processing chip records impulses from the metering counting wheel to calculate the quantity and velocity of the water flow. The processing chip may also read data from the pressure and temperature sensors. The processing unit is programmed with instructions and algorithms for various purposes including, but not limited to, monitoring and regulating power consumption in the energy storage unit, regulating and/or controlling two-way data communications, re-calibration, activation and deactivation, monitoring patterns for issuing alerts, and controlling components, such as the ball valve.

Implementations described herein are included to demonstrate particular aspects of the present disclosure. It should be appreciated by those of skill in the art that the implementations described herein merely represent exemplary implementation of the disclosure. Those of ordinary skill in the art should, in light of the present disclosure, appreciate that many changes can be made in the specific implementations described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The implementations described hereinabove are meant to be illustrative only and should not be taken as limiting of the scope of the disclosure.

What is claimed is:

1. A water meter comprising:
    a metering system comprising:
        a flow path with an inlet that includes a tapered section that forms a reduced-diameter section of the flow path as fluids flow past the inlet;
        a counting wheel with one or more blades embedded with a magnet, wherein the one or more blades are disposed in the reduced-diameter section; and
        one or more electronic switches near a housing of the counting wheel, wherein the magnet trips the one or more electronic switches when rotating by; and
    a power generation system coupled to the metering system, the power generation system comprising:
        a turbine positioned along a first flow stream in the power generation system, wherein fluids flowing through the first flow stream cause the turbine to rotate; and
        a door positioned in a second flow stream, wherein when a flow rate of fluids passing through the water meter is below a predetermined amount the door is in a closed position to prevent flow of fluids through the second flow stream, and when the flow rate of fluids exceeds the predetermined amount the door is in an open position to allow flow of fluids through the second flow stream; and
        wherein when the door is in the open position and the closed position a fluid flow path through the water meter is substantially linear.

2. The water meter of claim 1, wherein the predetermined amount is 5 gallons per minute.

3. The water meter of claim 1, further comprising a ball valve coupled to the metering system, wherein the ball valve is integrated with the water meter, and the fluid flow through the metering system, ball valve, and the power generation system is a substantially linear pathway.

4. The water meter of claim 1, wherein the water meter has a 60:1 turndown ratio or greater.

5. The water meter of claim 1, wherein the water meter provides accurate measurement of fluid flow when a flow-rate is equal to or between 0.25 gallon/minute to 20 gallons/minute.

6. The water meter of claim 1, wherein the water meter provides an acoustic sensor to detect leaking.

7. The water meter of claim 1, wherein the one or more blades of the counting wheel are curved into a direction of fluid flow.

8. The water meter of claim 1, wherein a front surface of the one or more blades is broad at a bottom to maximize contact with the fluid.

9. The water meter of claim 1, wherein a back side of the one or more blades is closed and curved away from a direction of fluid flow.

10. The water meter of claim 1, wherein the counting wheel comprises a structural rig disk at center of the counting wheel, wherein the structural rig disk is integrated into the one or more blades of the counting wheel to provide structural re-enforcement to the one or more blades.

11. A water meter comprising:
    a metering system for metering fluid entering the water meter, the metering system comprising:
        a flow path with an inlet for receiving the fluid, wherein the inlet leads into a tapered section that forms a reduced-diameter section of the flow path;
        a counting wheel with one or more blades, wherein at least a portion of the one or more blades is positioned in the reduced-diameter section so that the fluid flowing through the reduced-diameter section causes the counting wheel to rotate, wherein one or more blades of the counting wheel is embedded with a magnet; and
        one or more electronic switches near a housing of the counting wheel, wherein the one or more blades embedded with the magnet trip the one or more electronic switches when rotating past the one or more electronic switches;

a ball valve coupled to the metering system, wherein the ball valve is integrated with the water meter;
a power generation system coupled to the ball valve, the power generation system comprising:
  a first passageway;
  a turbine positioned along the first passageway, wherein fluid flowing through the first passageway causes the turbine to rotate;
  a second passageway; and
  a door positioned in the second passageway, wherein in a closed position the door prevents fluid flow through the second passageway, and in an open position the door allows fluid flow through the second passageway; and
wherein the first passageway is adjacent to and oriented parallel to the second passageway and at least part of a cross-section of the first passageway and a cross-section of the second passageway overlap at least part of a cross-section of the inlet.

12. The water meter of claim 11, wherein the door is in the closed position when a flowrate of the fluid is below a predetermined amount, and the door is in the open position when the flowrate of the fluid exceed the predetermined amount.

13. The water meter of claim 11, wherein the predetermined amount is 5 gallons per minute.

14. The water meter of claim 11, wherein the water meter has a 60:1 turndown ratio or greater.

15. The water meter of claim 11, wherein the water meter provides accurate measurement of fluid flow when a flowrate is equal to or between 0.25 gallon/minute to 20 gallons/minute.

16. The water meter of claim 11, wherein the one or more blades of the counting wheel are curved into a direction of fluid flow.

17. The water meter of claim 11, wherein a front surface of the one or more blades is broad at a bottom to maximize contact with the fluid.

18. The water meter of claim 11, wherein a back side of the one or more blades is closed and curved away from a direction of fluid flow.

19. The water meter of claim 11, wherein the counting wheel comprises a structural rig disk at center of the counting wheel, wherein the structural rig disk is integrated into the one or more blades of the counting wheel to provide structural re-enforcement to the one or more blades.

20. The water meter of claim 11, further comprising a wireless communication system that provides two-way communication.

* * * * *